United States Patent [19]

Polkinghorne

[11] Patent Number: 4,843,833
[45] Date of Patent: Jul. 4, 1989

[54] APPLIANCE CONTROL SYSTEM

[75] Inventor: John Polkinghorne, Burlington, Canada

[73] Assignee: TRW Canada Limited, Ontario, Canada

[21] Appl. No.: 89,026

[22] Filed: Aug. 24, 1987

Related U.S. Application Data

[63] Continuation of Ser. No. 708,918, Mar. 6, 1985, abandoned.

[30] Foreign Application Priority Data

Mar. 6, 1984 [CA] Canada .................. 448959

[51] Int. Cl.$^4$ .................. F25D 17/00; F25B 41/00
[52] U.S. Cl. .................. 62/180; 62/187; 62/208; 62/229; 62/156; 62/126; 62/127
[58] Field of Search .................. 62/180, 186, 187, 208, 62/213, 226, 227, 229, 200, 156, 150, 175, 126, 127, 129, 130, 182; 251/129.09, 129.1, 129.05

[56] References Cited

U.S. PATENT DOCUMENTS

| | | | |
|---|---|---|---|
| 2,492,970 | 1/1950 | Curry | 62/182 X |
| 2,856,484 | 10/1958 | Fairbanks | 251/129.1 X |
| 2,997,857 | 8/1961 | Clark | 62/187 X |
| 3,363,429 | 1/1968 | Wechsler et al. | 62/140 |
| 3,495,416 | 2/1970 | Morrissey, Jr. et al. | 62/156 X |
| 3,630,046 | 12/1971 | Boor | 62/187 X |
| 3,839,878 | 10/1974 | Tilmanis | 62/155 |
| 4,122,687 | 10/1978 | McKee | 62/156 |
| 4,127,765 | 11/1978 | Heaney | 62/150 X |
| 4,129,993 | 12/1978 | Schotten | 62/156 |
| 4,132,085 | 1/1979 | Maio et al. | 62/155 |
| 4,142,375 | 3/1979 | Abe et al. | 62/158 |
| 4,209,994 | 7/1980 | Mueller et al. | 62/155 |
| 4,232,530 | 11/1980 | Mueller | 62/126 X |
| 4,241,337 | 12/1980 | Prada | 340/547 |
| 4,264,034 | 4/1981 | Hyltin et al. | 236/47 X |
| 4,282,720 | 8/1981 | Stottmann et al. | 62/180 |
| 4,291,543 | 9/1981 | Alluto | 62/158 |
| 4,439,998 | 4/1984 | Horvay et al. | 62/200 X |
| 4,481,787 | 11/1984 | Lynch | 62/180 |
| 4,510,767 | 4/1985 | Komatsu et al. | 62/204 X |

FOREIGN PATENT DOCUMENTS 0120035 7/1983 Japan .................. 62/156

Primary Examiner—Harry B. Tanner
Attorney, Agent, or Firm—Fay, Sharpe, Beall, Fagan, Minnich & McKee

[57] ABSTRACT

This invention relates to a system for the control of electrical apparatus with particular reference to control by electric sensors, and with special reference to a control system for domestic appliances, such as refrigerators. The system may be adapted to control of appliances such as dishwashers, dryers, washers, stoves, etc. The preferred embodiment is microcomputer based. Thus, the system enables lower energy consumption, more accurate temperature maintenance and more effective servicing and monitoring of the mechanical condition of the apparatus to which it is applied.

20 Claims, 8 Drawing Sheets

APPLIANCE CONTROL SYSTEM

This is a continuation of co-pending application Ser. No. 708,918 filed on Mar. 6, 1985 abandoned.

BACKGROUND OF THE INVENTION

This invention relates to a system for the control of electrical apparatus with particular reference to control by electric sensors, and with special reference to a control system for domestic appliances.

Over the past 20 years, household appliances have not changed greatly in the way that they are controlled. They have always used motor timers with cam contacts, and bimetal, gas tube, or captive expansible liquid temperature sensors. In recent years, electronics have played a greater and greater role in improving the control capabilities of consumer products. More recently, the cost of microelectronics has fallen to a level where they can now be introduced to the massive appliance market. Microelectronics give the manufacturer the ability to enhance the performance of a product and at the same time, provide features that were previously cost prohibitive.

Here described is a controller system and associated novel equipment, initially designed for combination in the domestic refrigerator. It should be noted that with relatively minor changes it may be adapted to control other appliances such as a dishwasher, dryer, washer, stove, etc. The preferred embodiment is microcomputer based.

The standard domestic refrigerator is now well established and consists basically of two compartments, though there may be other compartments for specialized use, such as for custom ice making, ice cream freezing, etc.

An electric unit produces the cold, typically a motor driven compressor with external condenser unit and internal evaporator, with a rather crude method of controlling the compressor. The most common temperature control has been an electromechanical device having a bellows type cylinder, and a capillary tube filled with a liquid which expands on heating operating the bellows device to turn the compressor motor on and off. Periodically, frost which builds upon the evaporator from humidity in the environmental air must be removed to maintain cooling efficiency.

The first basic compartment is a freezer section to be maintained at approximately 0° F. (−18° C.) for the storage of frozen foods, and in which ice is made automatically or by the placing of trays of water to be frozen when required. The second basic compartment, in which the thermostat is placed, is a food section maintained slightly above freezing in the range of 33° to 39° F. (0.5° to 4° C.) and in which food is stored at a temperature which keeps bacterial growth and mould spoilage to a minimum, without producing any change of state of the food which would occur on freezing. The lower sections of the compartment are cooler than the upper sections because of the convective air flow. Certain sections of the food compartment are at various temperatures in this range, achieved by providing lids, by open or closed shelves, or by being formed within the wall or door and, therefore, subject to heat infiltration from outside. Yet other sections, such as a butter keeper, may be supplied with supplemental heat, for instance by an electric heater, so that butter can be maintained in a condition for easy spreading.

The preferred popular refrigerator is of the so-called "frost-free" type in which the user does not have to carry out the chore of defrosting and removing melted frost from the evaporator. In these systems, air is circulated over a finned evaporator unit placed adjacent to or in the freezer compartment, so that the cold air so formed can be delivered by a circulating fan to the freezer, and constitutes essentially the only heat exchange medium for the goods in the freezer. A fraction of the cooled air from the evaporator is routed to provide cooling for the food compartment. The circulating fan runs when the compressor is running. Frost build-up on the evaporator is removed at regular intervals by a heater, controlled from a timer, which provides for regular defrost every four to twenty hours depending upon the particular model concerned. The defrost cycle usually allows a period of about 20 minutes during which the evaporator is heated to a limit temperature of about 70° F. (20 C.). The wattage needed to effect the defrost is usually fairly high so that the ice is removed in a short time period and the cooled compartments do not warm unduly. The melted water is routed to a pan near the condensor so that the water will evaporate to the environment over the next few hour period.

A fault with the frost-free system is that each day, regardless of whether or how often the door has been opened, the refrigerator goes through its defrost cycle. The owner may be away on holidays for a period of one month—nevertheless the refrigerator defrosts every day or several times every day. Another drawback of this frequent defrosting is that the circulating air becomes very dry and any food in the refrigerator has a tendency to lose its moisture and the condition known as "frost burn" occurs.

A method of defrosting, which has some advantages to the timed daily cycling, provides that, on opening the door, a switch button is actuated and a pulse initiated. The pulses are recorded and after a predetermined number, the unit is caused to defrost. The disadvantage is that on humid days, the unit can frost up far more quickly than expected, so that operation become inefficient and in the last resort can be less satisfactory than the previously described timed method.

Only the food compartment is under thermostatic control, yet the main body of the cooling air is circulated through the freezing compartment, and the temperature of the freezer is dependent upon the running time of the compressor caused by the amount of use, door opening, thermal load, etc. of the food compartment. There is a hand operated damper for determining the fraction of cold air from the evaporator which is passed into the food compartment, but, even so, there are wide variations in temperature experienced in the freezer compartment. Furthermore, even if the freezer door is left open for periods which bring it above freezing, there is no sensing of the rise in temperature seen by the food compartment thermostat. The freezer temperature is thus under very haphazard control at best.

Refrigerators also have what is called a mullion heater, located in the mullion around the freezer compartment door and sometimes also around the food compartment door. The purpose of the heater is to remove excessive cold from the surface adjacent the door opening so that when struck by warm moist environmental air, moisture does not condense out around the door. Most units have a manual switch which the owner is instructed to turn on when required. The switch is in practice either on continuously, or not on at all, as most householders do not appreciate its significance. One method of controlling the mullion heater has been to turn it on whenever the compressor unit is on. In this there is no correlation to the presence of moisture.

A problem also arises with the butter compartment. Normally there is a three-position switch (OFF-/LO/HI) which can supply appropriate heat so that butter is relatively soft. However, the user has a choice of only three positions, people's preferences are different, and the temperature depends on the quantity of butter to be tempered. The arrangement is thus less than satisfactory.

In general, it is, therefore, true to say that the current domestic refrigerator suffers from several drawbacks. The temperature it provides in its freezer compartment can vary widely, and it may be required to defrost excessively often in dry weather if undue frost build-up in humid conditions is to be avoided. Excessive defrost activity is wasteful in requiring extra refrigerator operation and also gives more frequent rises in temperature in the freezer compartments than are desireable. It is wasteful in that heaters for the mullion and the butter compartment are either permanently on or switched off so that their advantages are not achieved. It may also be called upon to run more often or longer than necessary if the food compartment requires more than average cooling while the freezer does not.

Servicing of the refrigerator often involves more time and experimentation by the service man than would be necessary if some accurate idea of its failure could be given. Non-technical owners are notoriously inaccurate in their assessment of actual faults occuring in their domestic appliances.

BRIEF DESCRIPTION OF THE INVENTION

The present invention broadly relates to an improved control mechanism for altering the status of an object. In the preferred embodiment disclosed, this improved control mechanism is utilized as the main control for a frost free refrigerator. The improved mechanism controls both the temperature and the auxiliary functions of the refrigerator.

More particularly in accordance with the invention, the improved mechanism is for regulating the temperature of both the freezer and the food compartments of the refrigerator. The mechanism controls the temperature of the freezer compartment by intermittently sampling the temperature of such compartment and enabling or disenabling the compressor and a fan based upon the sampled temperature. The mechanism controls the temperature of the food compartment by intermittently sampling the temperature of such compartment and enabling or disenabling a fan and an air door opening into the freezer compartment based upon the sampled temperature.

According to another aspect of the invention, the air door between the food compartment and the freezer compartment comprises a shutter which is variably controlled between open and closed positions through the application of pulse coding techniques.

According to another aspect of the invention, the food compartment temperature control means includes an override mechanism which selectively prevents the compressor, otherwise under the control of the freezer temperature control means, from turning off until the food compartment has been cooled to its desired temperature.

According to yet another aspect of the invention, the defrost cycle of the evaporator coil of the refrigerator is triggered by a loss of efficiency of the evaporator coil in cooling the air flowing about it.

A primary advantage of the invention is the increased efficiency and reliability of the temperature control in a refrigerator.

Another advantage of the subject invention resides in the increased utilization of energy by the refrigerator.

Still another advantage of the invention is the increased control of the defrost cycle.

Yet a further advantage of the invention is found in the vast array of advanced features made available and adaptable to a variety of domestic appliances.

Other advantages for and benefits derived from the subject invention will become apparent to those skilled in the art upon a reading of the following detailed specification.

BRIEF DESCRIPTION OF THE DRAWINGS

Specific embodiments of the invention will be described hereinbelow with reference to the accompanying drawings in which.

DETAILED DESCRIPTION OF THE PREFERRED EMBODIMENT

Figure 1:
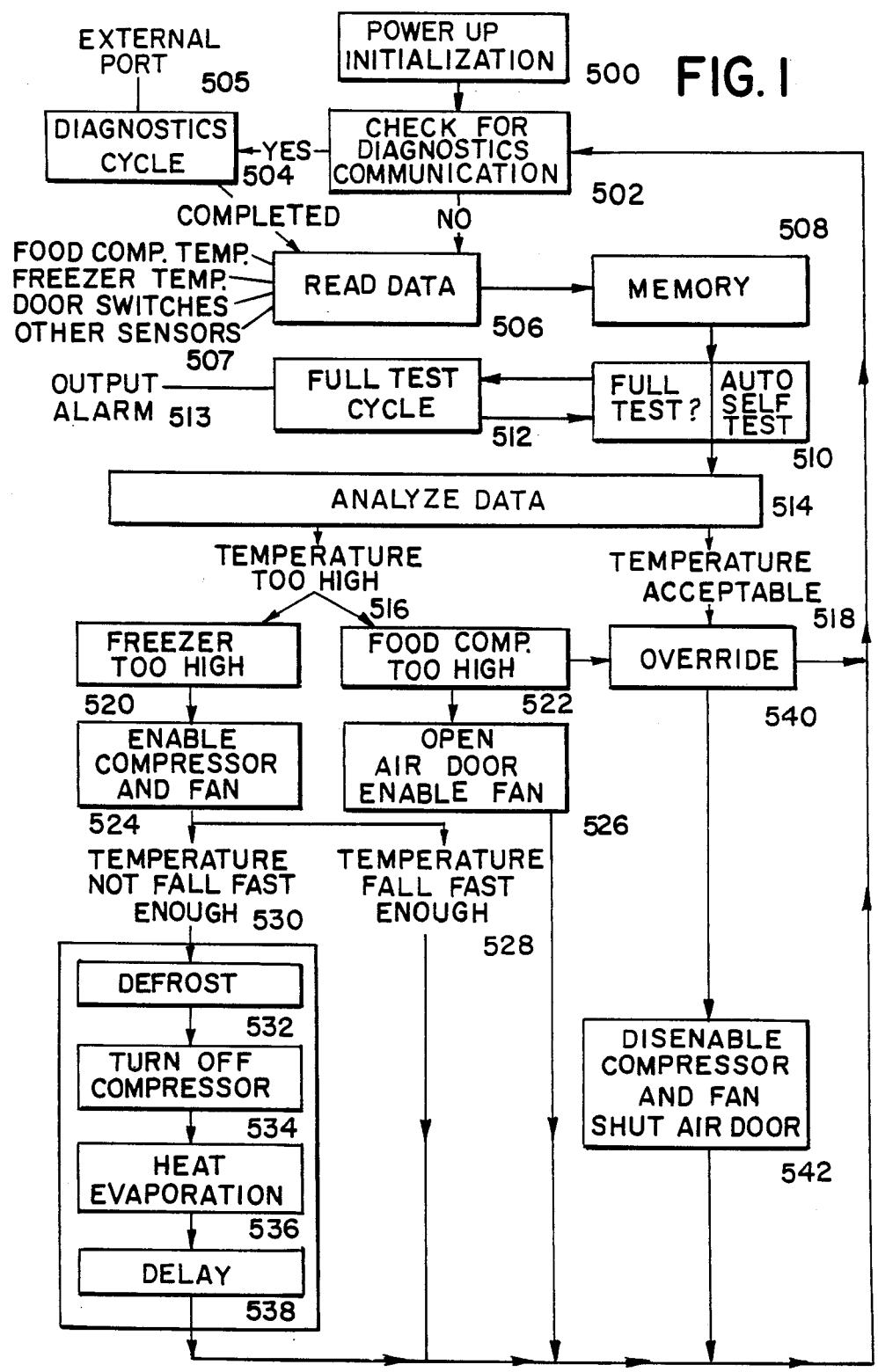
FIG. 1 is a flow chart of a refrigerator control system which incorporates the subject invention.

Referring now to the drawings wherein the showings are for purposes of illustrating preferred and alternate embodiments to the invention only and not for limiting same, FIG. 1 is a flow chart of a refrigerator control mechanism incorporating the subject invention. As shown, the flow chart is made up of a series of boxes representing various functions disposed in a certain pattern.

POWER UP INITIALIZATION

The first box of the flow chart of FIG. 1 represents the power up initialization 500 of the refrigerator control mechanism. The initialization selectively activates the ports and memory of the control mechanism to insure that all the control mechanisms of a specific refrigerator model line begin operation at a single predetermined point. The power up initialization 500 normally will only occur when power is applied to the refrigerator, whether for the first time or after subsequent power termination or brown-out. The power initialization 500 includes a few minute delay before output to allow for a stabilization of all parts of the refrigerator control mechanism.

CHECK FOR DIAGNOSTICS COMMUNICATION

The second box of the flow chart is the first operational stage of the refrigerator control mechanism, a check for diagnostics communication 502. During this stage, the refrigerator control mechanism checks whether or not the operator of the refrigerator has called for the diagnostic stage of the control mechanism as by, for example, pressing an external switch or otherwise providing a signal to enter diagnostic communications. If the operator has called for the diagnostic stage, the control mechanism activates a diagnostics cycle 504. During the diagnostics cycle, the sensors, switches, lights, microprocessor and other components of the control mechanism can be accessed from outside of the refrigerator through an externally opening access port 505. By connecting appropriate test equipment to the external port, the operator can quickly and easily adjust the control mechanism to its optimum status. Such adjustments are typically made during initial manufacture and after any subsequent repairs. In the event of a malfunction, the operator can also expedite troubleshooting of the control mechanism by pinpointing exact problems.

READ DATA PHASE

If no diagnostic cycle is called for, or if the operator has called for a diagnostic cycle at the end thereof, the control mechanism enters a read data phase 506. During this phase, the control mechanism scans the various temperature sensors, door switches, etc. 507 to determine the status of the refrigerator. The scan can be occasioned either sequentially or simultaneously, although sequentially is preferred. Normally, the data is determined as or translated into a voltage or a voltage drop. The data from the read data phase is fed into a memory 508 for storage in a digital form. The use of the combination of a sequential scan and a memory greatly reduces the hardware necessary for a practical, actual application of the control mechanism.

SELF TEST ROUTINE

After all of the pertinent data has been written into the memory 508, the data is automatically analyzed preliminarily by the control mechanism, in an automatic self test operation 510, to determine whether or not the various parameters are within a gross desired range. For example, in the case of a door, the gross desired range would be that the door was closed or had been open for less than one minute. For another example, in the case of the temperature of the food compartment, the gross desired range would be a temperature above 29° F. but below 50° F. If the data is outside of these various gross parameters, an alarm is automatically sounded without any operator involvement. The alarm alerts the operator that the refrigerator needs attention.

FULL TEST CYCLE

If the alarm sounds, or at any time the operator desires assurances regarding the correct operation of the refrigerator, the operator can, at his option, trigger a full active test cycle 512 of the operative components. To trigger the active test, the operator presses an external switch, opens and closes the refrigerator door so many times in so many seconds, or otherwise signals the control mechanism to begin the full active test cycle 512. During this active test cycle, the control mechanism examines the actual performance of the various components of the refrigerator and compares this performance with the limits previously established for such components. For example, the temperatures of the food and freezer compartments is measured to determine whether they are within a preferred range (30° to 48° F. for food compartment, −7° to 14° F. for the freezer), the compressor-evaporator combination is activated for a short time interval to determine whether or not the combination still has the capacity to cool the refrigerator properly, the defrost heater is activated for a short time interval to see if it still works, etc. The malfunction of any component is signaled to the operator via a unique combination of lights and beeps through an output alarm 513 or other appropriate means.

ANALYSIS OF DATA

Upon termination of the automatic self test routine 510, and optional full test cycle 512 if selected, the control mechanism analyzes the data 514 in the memory 508 to determine the actual control of the various refrigerator components, more particularly the compressor, fan, and air door between the food compartment and the freezer compartment. There are two basic alternatives in the control of a refrigerator, i.e., the temperature of the refrigerator is either too high 516 or else it is acceptable 518.

TEMPERATURE TOO HIGH

If the temperature of the refrigerator is too high, it can be due to either the temperature in the freezer compartment 520 or the temperature in the food compartment 522, or both. If the temperature in the freezer compartment 520 is too high, the control mechanism turns on the compressor and fan 524 if the control mechanism has not already done so on a previous pass through the flow chart. The fan blows air over the evaporator coil to cool the freezer. The evaporator coil changes the temperature of the air flowing thereover to function as a temperature changing means for the device. If the food compartment temperature is acceptable, the control mechanism insures that the air door between the freezer and food compartments is shut. If the temperature in the food compartment 522 is too high, the control mechanism opens the air door between the food compartment and a cold source, normally the freezer. At the same time, the fan is also turned on unless it is already on due to the freezer cooling demands, or unless the air door is open and the fan is already on as a result of a previous pass of the control mechanism through the flow chart. The food compartment thus cools itself by drawing on the cold within the freezer compartment. Except as noted, the initiation of the freezer and food compartment temperation modification cycles are independent.

DEFROST CYCLE

The air blown over the evaporator coil is supposed to lose heat to the evaporator coil when the compressor-evaporator cooling system is operating. If the air loses a sufficient amount of heat, and thus the temperature in the air falls fast enough as at step 528, there is no need to defrost the evaporator. If this is true, the control mechanism returns to check for diagnostics communication 502 and begin another pass through the flow chart. If, on the other hand, the temperature in the air does not fall fast enough as at step 530, it is necessary to defrost the evaporator since it has lost efficiency due to frost buildup.

The defrost cycle 532 begins with turning off the compressor 534. Since the defrost cycle utilizes the application of heat to the evaporator, it would be counterproductive to have the compressor in operation cooling the same evaporator at the same time. Turning off the compressor also minimizes the warming transient of the cooling fluid in the compressor-evaporator loop due to the operation of the defrost heater.

The second step of the defrost cycle is to heat the evaporator 536. The length of time that the heater is energized is dependent upon a sensor on or near the evaporator coil. When the sensor reaches a certain temperature, the heater is turned off.

The last step of the defrost cycle is a delay 538. This delay provides for a stabilization of the fluid within the evaporator-compressor loop. At the termination of the defrost cycle, the control mechanism returns to check for diagnostics communication 502 and begin another pass through the flow chart.

TEMPERATURE ACCEPTABLE

The control mechanism passes through the flow chart successively and goes through all the choices on about one minute intervals until the temperatures within the freezer and food compartments of the refrigerator are individually acceptable. Normally, the freezer and food compartments are independently controlled and the disenabling process can operate on one, the other, or both temperature modification processes as appropriate as at step 542. When the temperature in the freezer compartment is acceptable, the control mechanism shuts off the compressor and fan, i.e., reverses step 524, unless overriden as will be explained below. When the temperature within the food compartment is acceptable, the control mechanism shuts the air door between the freezer and food compartments, and shuts off the fan, i.e., reverses step 526, if the freezer has no use for it.

Under certain circumstances, however, the food compartment temperature sensor and not the freezer compartment temperature sensor controls the turning off of the compressor as at override 540. Should both the freezer temperature control 520 and the food compartment temperature control 522 call for cold at the same time, as when the refrigerator is first plugged in or a door is left open, the compressor will continue to operate until the temperature within the food compartment is acceptable, no matter what the freezer temperature. This is so even though the food compartment temperature control 526 has no direct control over the compressor. The super cooling of the freezer compartment caused by the override is an acceptable cost for the vast increase in speed in expediting cooling of the food compartment and the reduction of wear in the compressor. That is, the compressor remains on instead of going through an indeterminate number of quick on-off cycles as would occur without the override. The override 540 acts by returning the control mechanism to the diagnostics communication 502, bypassing the disenable compressor step 542 which would otherwise shut the compressor off. If the food compartment temperature is acceptable before the freezer temperature, control of the termination of the compressor and fan is returned to the freezer sensor.

The control mechanism cycles through the flow chart about once each minute, except when it is interrupted by the diagnostics cycle 504, the full test cycle 512, and/or the defrost cycle 532. During each cycle the control mechanism follows the most appropriate path.

Physical embodiments of the subject control mechanism are shown in the drawings which comprise FIGS. 2-6 and will be described.

A REFRIGERATOR CONTROL MECHANISM

Figure 2A:
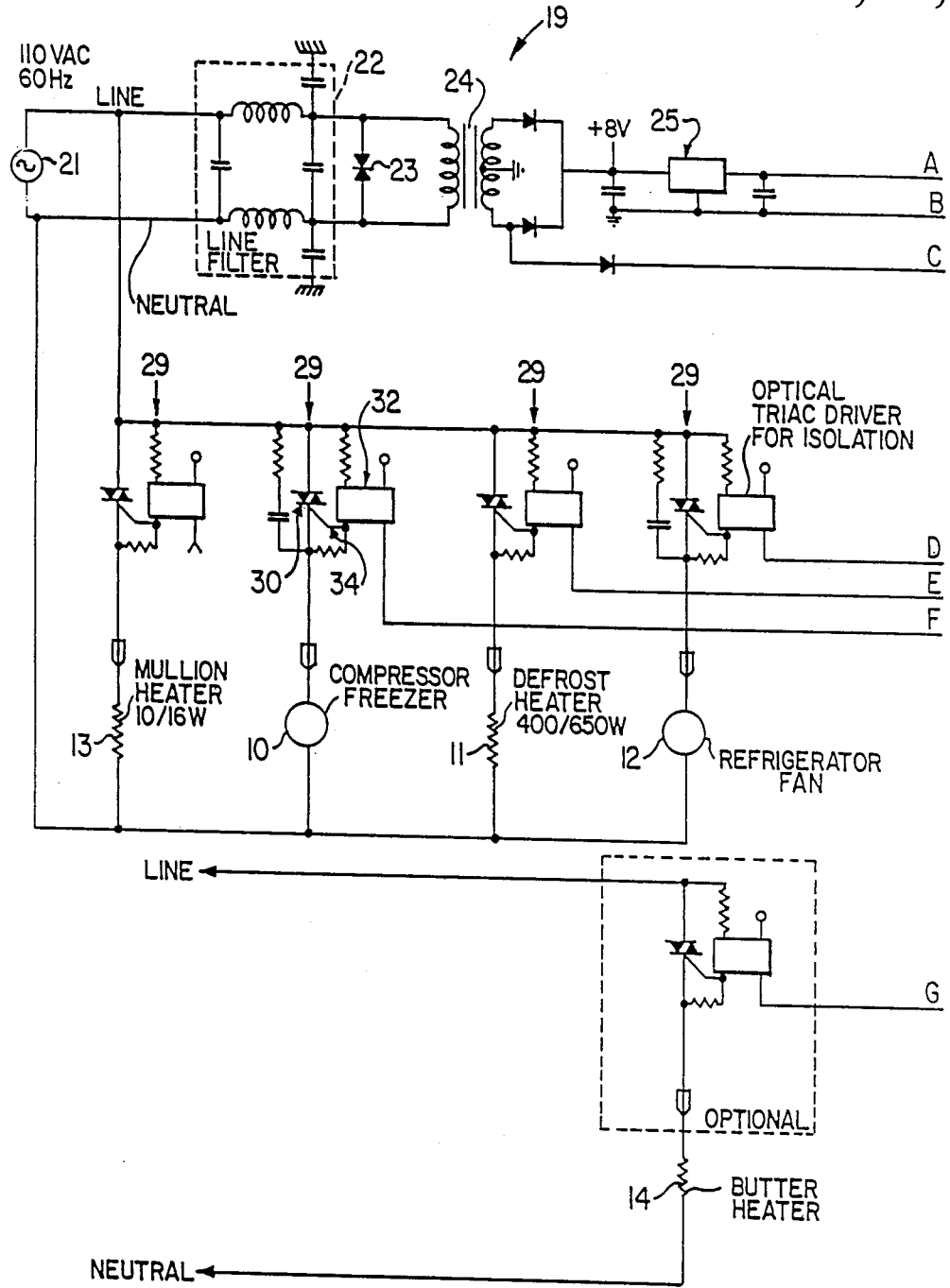
FIG. 2 comprising parts of FIG. 2A and FIG. 2B connected as shown in FIG. 2C is a schematic circuit diagram of a refrigerator control system utilizing the flow chart of FIG. 1.
Figure 2B:
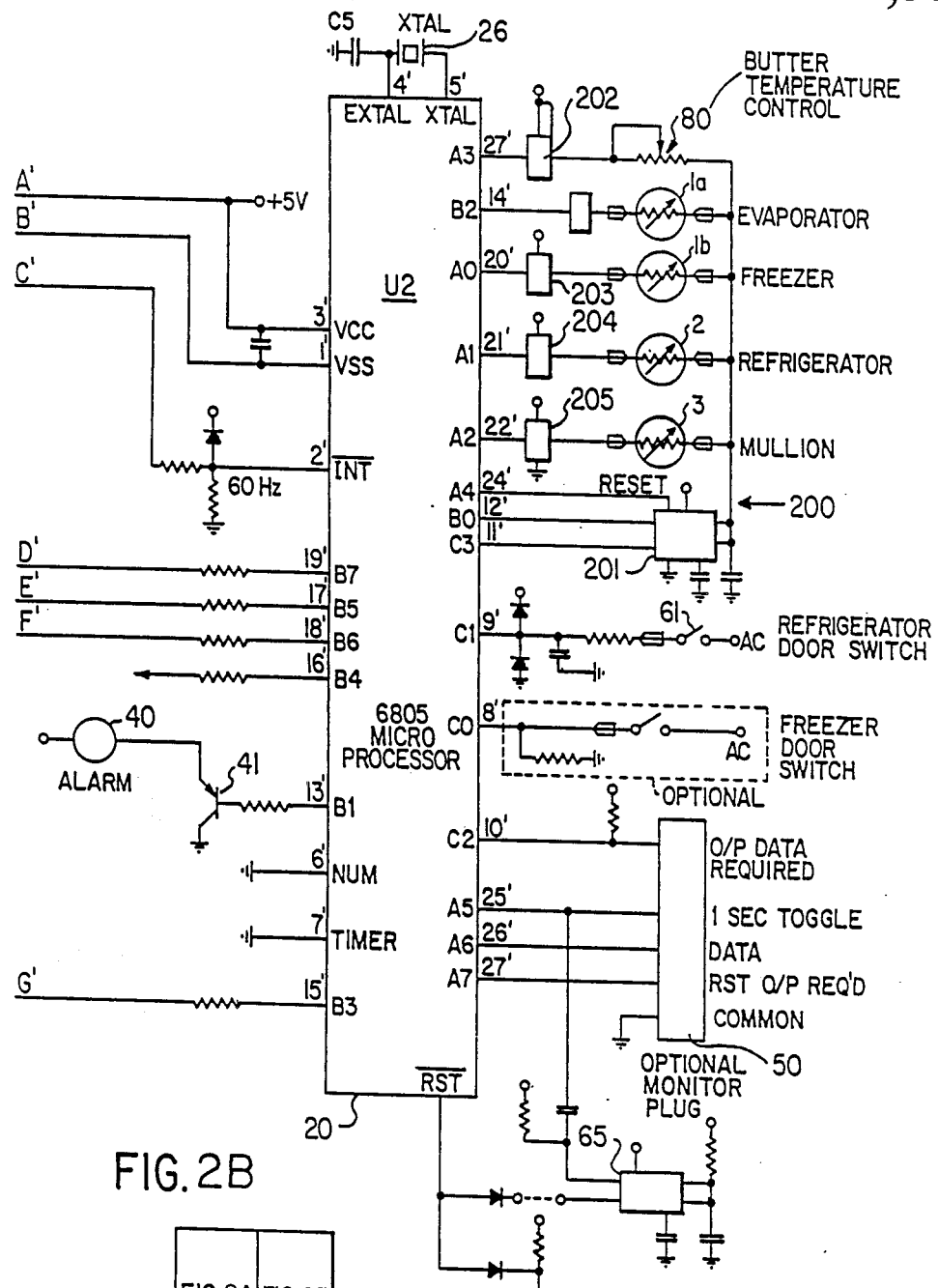
Figure 2C:
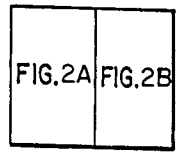

As illustrated in FIG. 2, a refrigerator is provided with four temperature sensors (resistors of positive or negative temperature coefficient as determined by the remaining circuitry) 1a, 1b, 2 and 3 mounted respectively in the freezer compartment (two sensors), the food compartment and on door mullion surface respectively. There is a refrigerator drive compressor 10, the refrigerator system including an evaporator (not shown) mounted adjacent the freezer compartment with a defrost heater 11 mounted on the evaporator. A fan 12 acts to circulate air over the evaporator, which air is taken in from both compartments and delivered, after cooling by the evaporator to one or both compartments dependent upon the setting of a diverter damper. A mullion heater is shown at 13, and butter compartment heater at 14.

Interposed between the sensors and the units to be controlled is a micro-computer chip 20 (typically a Motorola 6805 P2 providing 1 kilobyte of memory, or a 6805 P4 for 2 kilobytes). Interrogation of each sensor is effected by applying voltage through the sensor concerned to line 200 to timer 201 under command from strobe output 12' of chip 20. The input 11' is simultaneously read. The analogue responses obtained from the sensors 1a, 1b, 2, 3, and 80 are converted to digital signals within the unit 20 for processing therein.

The unit 20 is powered from the AC supply mains 21 and comprises a power supply 19, including typical line filter circuitry 22, noise spike limiter 23, a step-down transformer 24, and DC regulating circuit 25. The microchip 20 is thereby provided a 5 volt DC input between its pins 1' and 3' and generates a clock signal at the frequency of ceramic resonator 26 mounted between pins 4' and 5'. Unit 20 has a number of ports which can be used interchangeably either for input or output, and of which advantages will be detailed later.

The control circuits 29 for each of the items 10 to 14, and exemplified for compressor 10, comprise a triac 30, dv/dt control RC circuit 31, and optical isolator drive 32. The isolation is necessitated by the need to avoid any electrical feedback to the microchip 20 by the system under control. For the compressor 10, the optical isolator 32 is fed through resistor 33 from pin 18' of the microchip 20. The isolator 32 ensures that gate 34 switches the triac on during each half cycle of the AC supply cycle when actuated, so that the compressor 10 can receive operating power. Initial switching is effected at zero cross over of the AC cycle, sensed in microchip 20 from input 2. This minimizes the generation of R.F. interference. The remaining control circuits 31 operate identically to that for compressor 10, with the exception that for the purely resistive loads, such as heaters 11, 13 and 14, the RC circuit is not required.

Provided at 40 is an alarm, driven, more simply than items 10 to 14, since it is powered from supply 19, through transistor 41 from output pin 13' of the chip 20. Inputs are also provided from a food compartment door switch 61, and freezer compartment door switch 60. In circumstance where the freezer or food compartment door has been left open for a period exceeding a chosen maximum time, the alarm is sounded, as will be described later. A monitor plug 50 through which a servicing data logger can be coupled to the unit 20 for diagnostic purposes is also provided as explained later. Reset circuitry 65 effects reset of the micro chip 20 when required to avoid upset and improper operation from random interference in known manner.

The various aspects of the operation of the new system will now be described under separate headings.

A TEMPERATURE CONTROL CONTROL MECHANISM

The directing of the air to the freezer compartment on the one hand, and the food compartment on the other, after it has been cooled by the evaporator in the frost free system has always been very approximate. In most refrigerators, the baffle is controlled manually by the user setting the baffle between a minimum and a maximum flow to the freezer compartment judged generally by the state of food in the freezer, e.g., as by consistency of ice cream which hardens noticably at about 0° F. More accurate systems have employed some kind of cable control to the baffle operated by a temperature sensitive bellows which can be set by the owner to a preferred temperature. The control effected is quite coarse and the system has a very slow response so that it cannot recover quickly from door openings, heavy refrigerator loads, or temperature rises produced in the defrost cycle.

The present arrangement allows response to changing temperatures in a very short time period and can alter air flow, dependent, for instance, on food compartment temperature, freezer compartment temperature, number and duration of door openings, defrost cycle disturbances, etc.

AN AIR DOOR CONTROL MECHANISM

Figure 3:
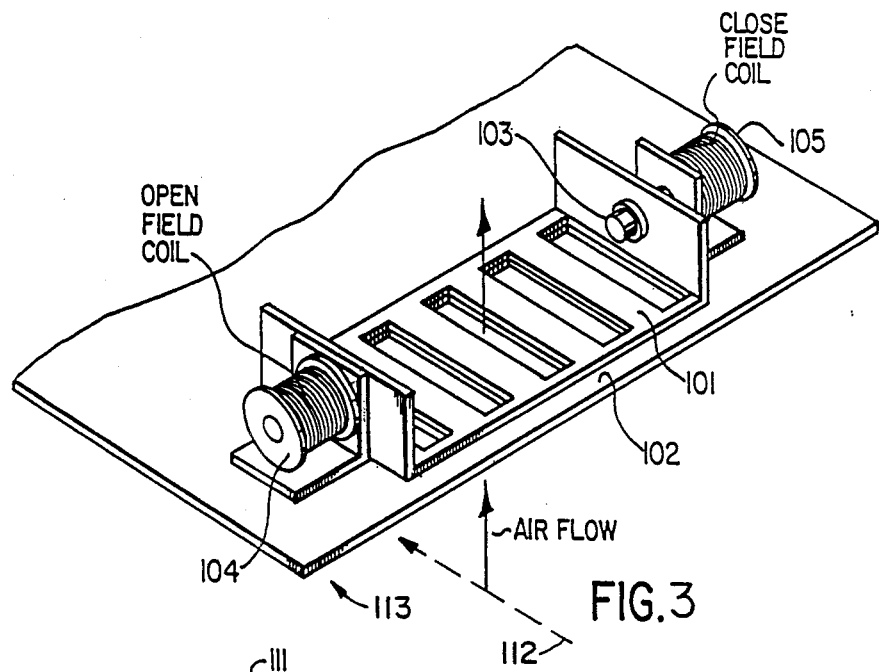
FIG. 3 is a perspective view of a damper arrangement for clarity this FIGURE is shown inverted from its typical orientation.
Figure 6:
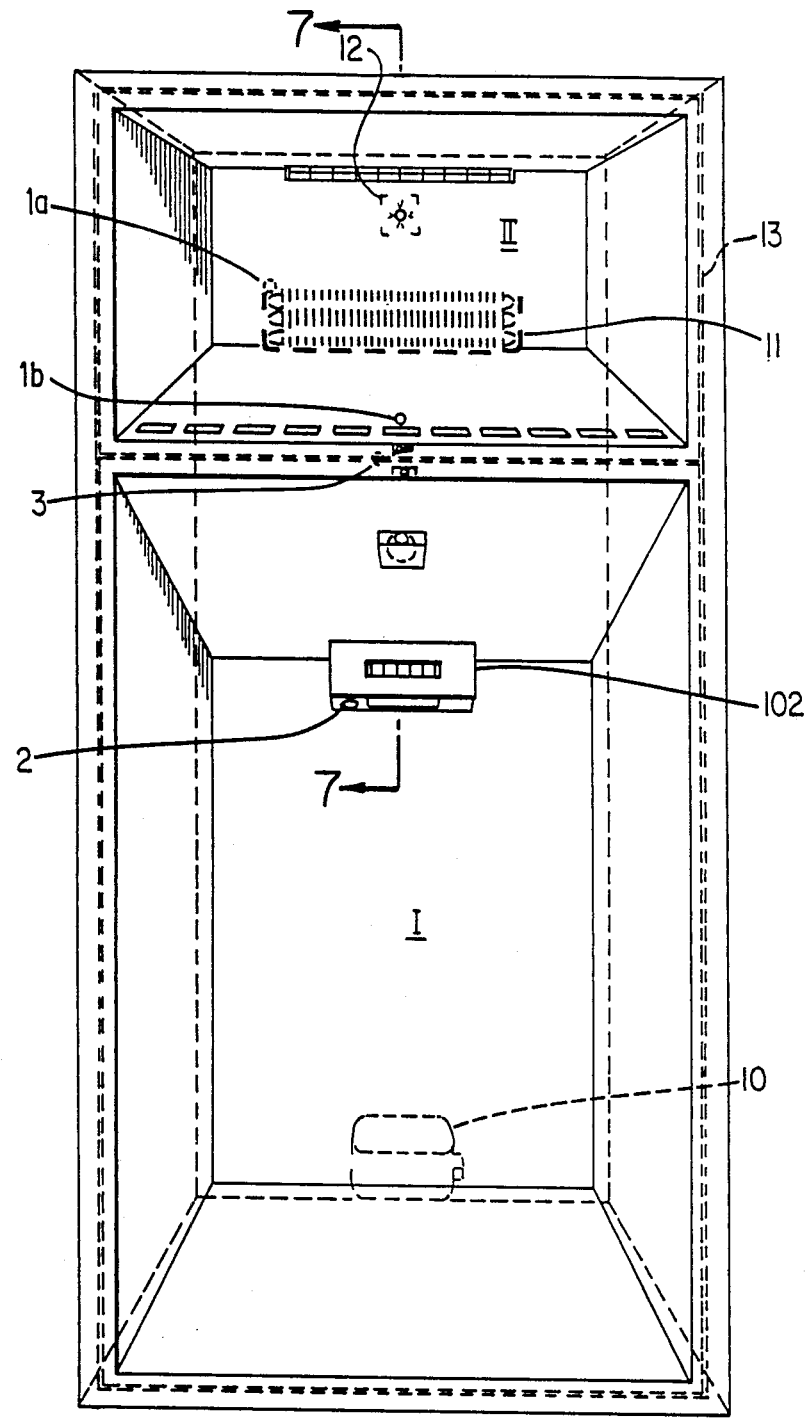
FIG. 6 is a front view of a refrigerator showing typical locations for the various elements comprising the control system herein described; and, FIG. 7 is a partial cross-section side view of the freezer compartment of FIG. 6 taken along Section Line 7—7.
Figure 7:
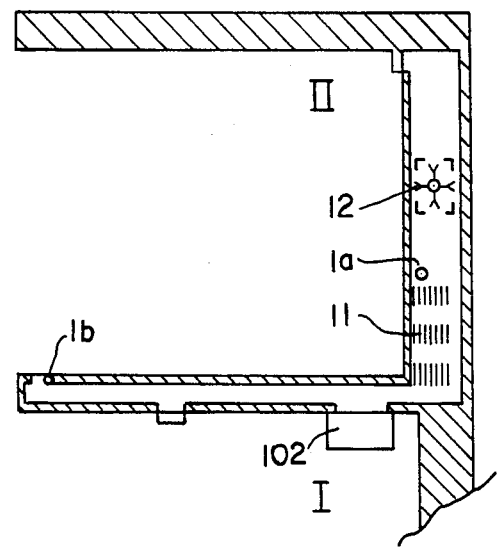

With reference to FIG. 3 and FIG. 6, air 112 flows from the evaporator 11 in a passage 113 between the freezer II and refrigerator I compartments. A baffle arrangement is shown which allows air flow 112 from the evaporator into the food compartment or shuts off this flow. When air is flowing from the evaporator into the food compartment, the air flow is generally transverse of the baffle arrangement. The remaining air from the evaporator at all times passes to the freezer compartment. The baffle comprises a slotted damper 101 mounted on housing 102 forming part of the printed circuit board for the control electronics of FIG. 2. The damper 101 is the only moving part in the baffle and has core pins 103 mounted thereto which are receivable within field coils 104 and 105. The board and housing can be accommodated in the refrigerator cabinet at the appropriate point for the baffle, as determined by the refrigerator manufacturer. The advantage of mounting all the circuitry and the baffle as one unit means that a single placing operation is all that is required. Because all the control circuitry is immediately adjacent the baffle, no external hook-up wire connections to coils 104 and 105 are needed. Due to the controlled movement of the damper, no catching means is needed to hold the damper in position.

To minimize heating and reduce power supply requirements, the field coils are pulsed from a reservoir capacitor, typically for a period of 200 ms for each movement of the damper required. Each pulse moves the damper against friction to closed or open conditions, respectively, and the direction of movement of the baffle is determined by the particular coil which is pulsed. The frictional arrangement ensures that the damper remains in the position to which it has been moved by the pulse and is unaffected in position by the air flow. In the structure shown, the air flow 112 is transverse to the sliding damper, so that there is little tendency for the flow to cause damper movement.

Figure 4:
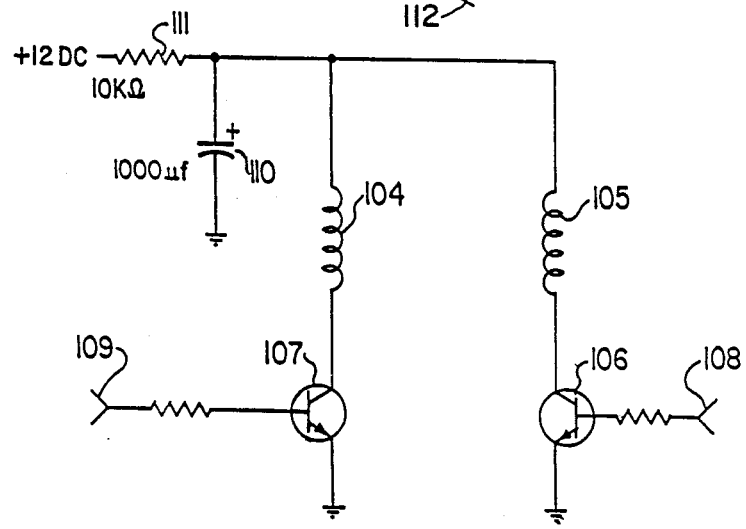
FIG. 4 is a schematic circuit diagram of an operating circuit for the apparatus of FIG. 3.

By timer means incorporated into the software for the micro chip 20, or by separate timer means, the baffle condition can be refreshed every minute by sending of the appropriate 200 ms pulse. Due to the movement and control of the baffle, a position sensor is not necessary for smooth and accurate operation. If coil 104 has been energized (or energized last), the baffle is in one known position. If coil 105 has been energized (or energized last), the baffle is in a second known position. Positioning of the baffle can thus be easily established at any time without any uncertainty or confusion. The operating circuitry for the field coils is illustrated in FIG. 4 as comprising switching transistors 106 and 107, respectively, operated at inputs 108 and 109 connected the micro processor 20. The operating power supply including power for the transistors is fed from a 12 v D.C. source through resistor 111 to capacitor 110. By adopting pulsing for the coils, a smaller power supply is required than in using typical current switching systems because the total energy required to move the damper can be accumulated over each 1 minute time period. Typically, a 12 volt coil is found to require 300 ma. Pulsing does not alter the current necessary, however, by using a 1000 Mfd capacitor as a storage device charged through a 10,000 Ω resistor to transform a continuous supply of long term low energy into a short pulse of high energy, the maximum charging current is only 1.2 ma. The power supply requirement is thus very modest.

OPERATION OF THE TEMPERATURE CONTROL MECHANISM

The control mechanism examines the sensors in the food and freezer compartments, preferably in an alternate manner to reduce the hardware required for the device. Due to the control mechanism, the temperature in the food compartment and freezer compartment can now be controlled in such a way that the compressor is turned on only when sensor 1b detects a freezer high temperature limit, (say 10° F.), and such detection also operates the fan. Dependent upon the temperature detected by sensor 2 in the food compartment, the damper may be pulsed closed to direct maximum air flow to the freezer compartment, or pulsed open to distribute the flow between the freezer and food compartments.

If sensor 2 detects high limit, the system will place the damper in an open position until sensor 2 detects low limit, at which time the air flow damper is closed and flow to the freezer compartment will again be maximized until sensor 1b also reaches the low limit and turns off the compressor and fan. If low limit is detected by sensor 1b before low limit is detected by sensor 2, the compressor is maintained in operation, the fan remains on, and the damper stays open until such time as sensor 2 also detects low limit. The compressor is then stopped and the fan turned off. This simple arrangement may result in some subcooling of the freezer compartment below its set minimum. This is not unduly detrimental to the freezer contents given the advantage in cooling the food compartment this override produces. Nevertheless, the arrangement is such that if high limit is detected by sensor 2 before sensor 1b reaches high limit, only the fan is turned on and the damper opened to direct air to the food compartment. This arrangement has the advantage of avoiding unnecessary running of the compressor while excess cold exists at the evaporator and in the freezer compartment and also helps to minimize overshoots in freezer compartment temperature.

Additional useful concepts are to arrange that the fan be switched off whenever the food compartment door or the freezer door is opened for a period of less than one minute. It can be presumed that if either door is open longer than one minute, it is unintentional and the fan should be switched on again to minimize consequent temperature rises in the freezer and food compartments. Start of the fan is delayed for 2 minutes following start of the compressor after a defrost cycle to ensure that only cool air is directed to the compartments. Additional time delay is provided for 5 minutes before the compressor can start after its last switch off to allow for pressure stabilization.

It will also be appreciated by those skilled in the art that further sophistication to the circuitry can be accomplished to allow closed loop feedback control from the damper to the operating system, instead of the open loop arrangement described. The damper could be continuously variable in position, such as by integrating or counting the number of pulses demanding opening or closing in a given time period and moving the damper to the appropriate weighted position. The baffle system may also be further refined to be structured in one position to divert all air to the freezer compartment, in the opposite position to the food compartment, and in an intermediate position to both compartments, dependent upon whether one or both compartments require cooling as determined by the circuitry described above.

A DEFROST CONTROL MECHANISM

It has been found that accurate freezer compartment temperature sensing and freezer defrost control sensing can be achieved by use of the two sensors 1a and 1b, the first placed where it can sense envelope air at the evaporator. "Envelope air" is defined as the air immediately surrounding the evaporator coil and can be sampled by placing the sensor 1a at a distance of substantially about 1 centimeter away from the evaporator. The location with respect to the evaporator is critical, in that sensor 1a must be placed beside or above the evaporator so that defrost water does not fall onto it and so that it is not immediately adjacent the defrost heater, which typically is placed beneath, but accommodated, in the fins of the evaporator.

This system provides a "defrost on demand" arrangement. The efficiency of the evaporator as a cooling device decreases as an insulated blanket of frost builds up on it, and it is found that by measuring the temperature vs. time, the efficiency of the evaporator, a measure of the frost thickness can be obtained. The single sensor 1a measures such efficiency. Factors which also affect the cooling efficiency are refrigeration degradation through wear of the apparatus and leakage of refrigerant. The load in the freezer compartment (quantity of food) and frequency of door openings, which might be expected also to affect the cooling efficiency measurements, are found not to be of significance when the sensor is mounted as described in the envelope air. There is, therefore, a "worst case" situation in which the gradient of temperature against time for the evaporator in the presence of a chosen maximum frost thickness is least.

The second sensor 1b, strategically placed in the return freezer air passageway, gives a close measure of the freezer compartment temperature. It should be noted that the first sensor 1a technically could perform this function by measuring the air near the evaporator. This would, however, entail some sacrifice in the time and precision of activation. The sensor 1b is arranged so that it will switch on the freezer at a chosen upper temperature (typically 10° F.). After the freezer is switched on, the evaporator envelope air temperature from sensor 1a is inputed into the micro computer 20 and the temperature in the air envelope monitored over a time basis. If the rate of fall of such temperature after a setting up time delay (typically one minute) is greater than the assumed worst case, the evaporator can be said not to require defrost. If the rate of fall of such temperature is less, defrost should be initiated.

It may be desirable to include an override, preventing defrost if at any time sensor 1a detects a temperature of less than −10° F. A check can also be performed by the unit 20 to determine the time which has elapsed since the last defrost cycle, if this is less than an assumed minimum (typically 8 hours), which would occur in worst case humidity conditions intended to be covered, the defrost is inhibited. It is found typically that the gradient should be measured after fifteen minutes of compressor run time. If the measured temperature is above a predetermined value, the defrost cycle is initiated.

The defrost cycle involves turning off the compressor 10 and the fan 12, and turning on the defrost heater in response to sensor 1a. This is effected through the respective circuits 31 and respectively through outputs 18, 19 and 17 of micro chip 20. The heater 11 remains on for a maximum of 21 minutes as measured by the micro chip 20 or is terminated earlier if the sensor 1a, which can now act as a high limit, triggers earlier by detecting a temperature of 70° F. (21° C.) in the envelope air. The single sensor 1a thus can both initiate and terminate the defrost cycle.

The compressor and fan are not immediately started after high limit or time out, since it is desirable to allow a 5 minute stabilization period for equalization of differential pressure between the high and low side of the compressor, caused by evaporation of refrigerant in the heated evaporator. After this 5 minute stabilization period, the micro chip 20 switches on the compressor 10, since the sensor 1b is detecting a temperature above 10° F., but allows a further 2 minute time delay before turning on the fan, so that cold air can build up around the evaporator before being directed into the compartments of the refrigerator. This is an advantage over the known models of refrigerators since the freezer compartment is returned to its normal temperature as soon as possible after defrost. This can be considerably delayed where the control for the compressor is in the food compartment which may still be cool enough even after a defrost cycle.

As an optional arrangement, a freezer door switch 60 and/or a food compartment door switch 61 (see FIG. 2) can be provided to input 8 of the micro chip 20. This can inhibit any response to cooling gradient measured during a time that the doors are open or for a predetermined period thereafter. This will afford protection against large volumes of warm air entering adjacent the evaporator which could have some effect on the measured gradient. It is also possible for the micro chip to be set up so that it can store a current "best" cooling gradient profile of the evaporator, such as the second (uninterrupted) cooling cycle after a defrost cycle, to further enhance accurate detection of frost build up. The gradient measured in each subsequent cooling cycle is compared against the stored gradient, and when a chosen difference is detected due to frost buildup, defrost can be effected.

Due to the use of a single sensor 1a to measure the changing temperature, the control mechanism can sense also when sensors output does not change at all. This condition can be due to a gross sensor failure, due to a failure in the compressor-evaporator cooling loop, or due to a failure in the defrost heater. Exactly what has failed can be determined by the time of unchanging sensor output (all the time-sensor failure, during cooling-compressor failure, during defrost-heater failure). The control mechanism can sound an appropriate alarm to indicate the failure.

A MULLION HEATER CONTROL MECHANISM

Prevention of moisture build-up on the sensitive mullion surface of the refrigerator is achieved by controlling the surface temperature using heater 13 so that it remains above the expected dew point (say 55° F. assuming a worst case humidity of 75% at 70° F.). Energy is conserved by turning the heater off if this surface exceeds 65° F. In the preferred embodiment, the micro chip 20 effects the control and switching by determining the current resistive value of sensor 3 (mounted on the inside surface of the mullion) and actuating the mullion heater control circuit 29 when a sensor 3 resistance is determined equivalent to a surface temperature of approximately 55° F. The heater remains switched on under the control signal fed from output 16 until such time as sensor 3 reaches a value equivalent to 65° F. The values between 55° F. and 65° F. are thus in a so-called "dead band" control area where the heater does not change state. The heater is, therefore, toggled between one and other of its conditions when the surface temperature of the mullion attempts to leave the controlled range. While this control is shown as being incorporated as part of the micro processor control system, it will be clear to those skilled in the art that such mullion heat control could be effected independently by mechanical or other thermostat switching for temperature sensed on the mullion or at another suitable point.

A BUTTER KEEPER CONTROL MECHANISM

Additional optional features can be included in the apparatus such as the adjustable butter keeper whose temperature is set by the variable resistance 80 received in or adjacent the butter compartment. Butter heater 14 is thus toggled on and off as required to maintain the compartment within a limited range of temperature whose actual value is controlled by the setting of resistance 80.

A DOOR ALARM CONTROL MECHANISM

An alert to the owner that the food compartment door or the freezer door is open or not fully closed can be arranged, where the alarm will sound after a fixed time period during which the appropriate door switch is operated. A one minute period is suitably such a time. The alarm can, for instance, sound twice after the one minute period and then go into continuous operation or continuous pulsed operation after, say, a further twenty seconds or half minute. This arrangement allows the owner sufficient time to load the food and freezer compartments, but will advert to a permanent situation. Again, this can be most usefully accommodated in the micro chip program, to sample the input from the door switches and produce the appropriate output to the alarm switching transistor 41. Those skilled in the art will appreciate that other timer circuitry could replace the microcomputer for sounding the alarm and the appropriate time and in the appropriate manner.

The food compartment and freezer door switches can also be made to control a light through the micro chip 20, arranged to operate a control circuit 29 similar to that for the other resistive loads.

Since the switches and sensors are all operating at low voltage and low current conditions, they have improved life and lower radio frequency interference generation, and have less stringent insulating and safety considerations than such components operated in conventional fashion at full 120 volt AC supply conditions. In the present device, only those pieces of apparatus requiring a 120 volt supply are in fact operated from it, and by adopting the zero cross-over switching described earlier for the controlled triacs, radio frequency interference is additionally minimized.

HALL DEVICE SWITCHES

Although items 60 and 61 have been illustrated as make and break switches, particularly effective are Hall effect devices which can be mounted on the door mullions where they are influenced by the magnetic field from the magnetic gasket used to seal the typical refrigerator door. The switching available using such an arrangement will produce no radio frequency interference. The use of a Hall effect device to indicate the refrigerator door position is of particular significance because the magnetic activator required is already an integral part of the door sealing gasket. The Hall device is one more step in the evolution from mechanical to solid state switching. The device is located in the surface of the door closing area and, therefore, does not protrude into the compartment area. Many refrigerator products have special space concessions to accommodate a mechanical switch and so no consumer area is sacrificed by use of the Hall device. Since the Hall device is a low voltage device, it is compatible with solid state controllers.

A TEST CYCLE CONTROL MECHANISM

The arrangement of FIG. 2 also allows for the apparatus to be run through a diagnostic test routine when servicing or when being initially tested at the factory to determine that all components of the refrigerator are operating within specifications. Typically, such a test diagnostic routine can be initiated by operating one of the door switches in a coded fashion. For instance, a suitable arrangement is to provide that if the food compartment door switch is turned on five or more times within a period of 20 seconds after an initial operation, the micro computer 20 will enter the diagnostic routine. Typically, such a routine may comprise beeping of the alarm five times on entry into the routine; permitting a five minute rest period for pressure stabilization of the compressor; turning on the compressor; 1 minute after start of the compressor turning on the fan; 4 minutes after start of the fan checking both food compartment and freezer compartment sensors 2 and 1b for a given temperature gradient; if the gradient is outside specifications signalling one beep for freezer error, two beeps for food compartment error; switching off compressor and fan, and switching on defrost heater for a 1 minute period; and, checking that a positive temperature gradient is present and if not, signalling three alarm beeps. The program can also check for an efficiency bit in the normal operating program of unit 20 which would have been set if at any time during operation of the device, there has been a request for defrost within a chosen maximum time period following the completion of a defrost cycle. (This would be a fault condition because it would indicate that even after defrost, the proper negative temperature gradient had not been achieved). When detecting a set efficiency bit four alarm beeps are provided. Finally, on exiting the diagnostic routine, the alarm is beeped 10 times.

OUTPUT ROUTINES

The information discussed for the diagnostic routine and other information from the micro chip 20 could also be obtained from a printer which can be connected at the monitor plug 50. This is of particular advantage when final assembly testing the device at the factory, and is also useful to the serviceman. The information available can be any or all control parameters handled by the micro chip 20 and can be connected directly, if desired, into an available computing system for record and calculation rather than merely being printed out. The advantages for time saving and accuracy of results will be obvious to those skilled in the art, the only penalty being the necessity for a small software routine to be included in the micro chip 20.

Instead of the alarm 40, a liquid crystal or light emitting diode display could be used for the signalling described. A wide range of time functions are available, from providing simple clock readout through stop watch type timing functions to providing information on the length of time food products have been in the refrigerator. A key board entry could be included for more detailed data on specific food items, etc.

While the present disclosure has dealt with problems and their solutions with respect to refrigerator, similar temperature sensing arrangements and their control of power can be used for stove elements, clotheswashers, dishwashers, dryers, etc. Control of and delivery of routines based on time, temperature or water level, smoke, steam, or moisture detection, etc. may be similarly made by micro computer or partly or fully analogous mechanical control such as described for FIG. 2.

Figure 5A:
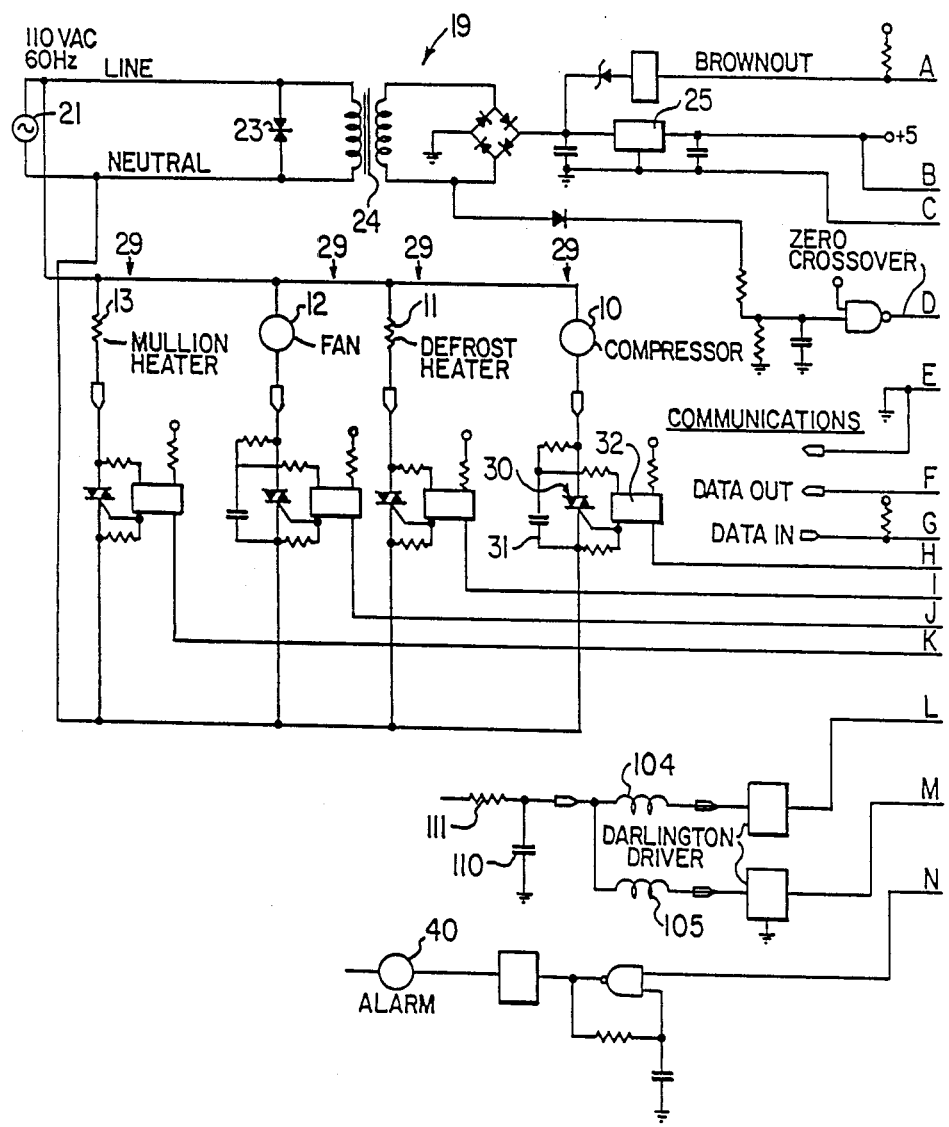
FIG. 5 comprising parts 5A and 5B connected as shown in FIG. 5C is a schematic circuit diagram for an alternative embodiment of a refrigerator control system embodying this invention.
Figures 5B, 5C:
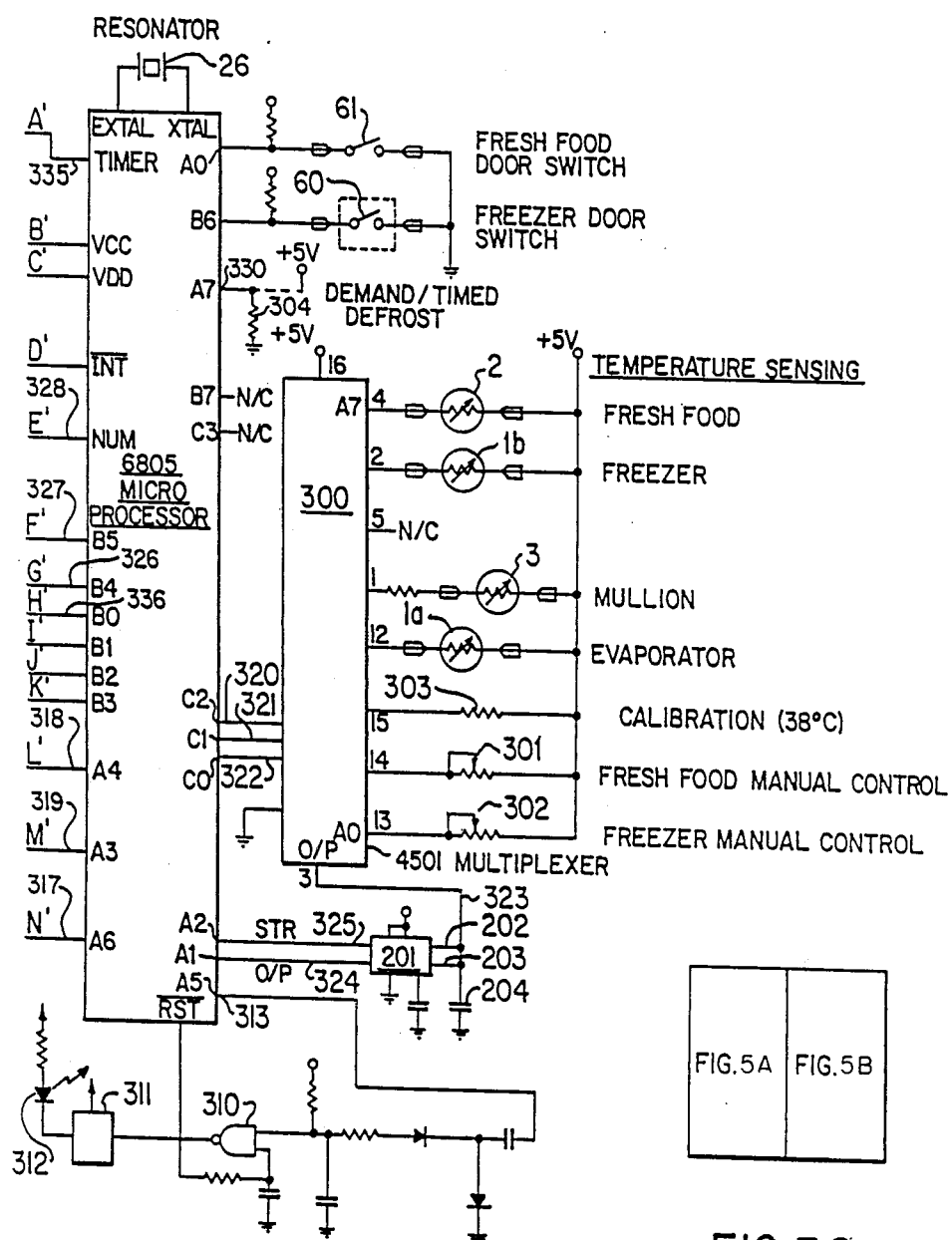

In FIG. 5, there is illustrated an alternative embodiment of the refrigerator control system according to this invention. Many components are common to those of FIG. 2 and are similarly referenced for ease of understanding.

Finally, FIG. 6 illustrates the placement of the various components of the system in a typical refrigerator. Thus, the compressor 10 is located at the bottom of the food compartment I and the fan is located in freezer compartment II. The circuitry for the control system is incorporated in the housing 102 for the air door (damper), which controls air flow between the evaporator area and the compartments I and II. The defrost sensor 1a is located slightly above and to one side of the evaporator (as hereinbefore described) to prevent defrost water falling into it.

Other modifications and alternatives will be apparent to those skilled in the art without departing from the spirit and scope of the present invention.

The embodiments of the invention in which an exclusive property or privilege is claimed are defined as follows:

1. A refrigerator-freezer combination comprising:
   a refrigerator compartment for holding food stuffs that are to be maintained at a chilled, above freezing temperature;
   a freezer compartment for retaining food stuffs that are to be held at a below freezing temperature;
   a cooling coil disposed in the freezer compartment for cooling air below freezing when receiving a coolant fluid from a compressor;
   a fan means for circulating air over the cooling coil;
   a duct work system operatively connecting with the refrigerator compartment, the freezer compartment, the fan, and the cooling coil such that the fan draws air from both the refrigerator and freezer compartments and circulates it over the cooling coil, the duct work system further channelling cooled air from the cooling coil to the freezer compartment and from the frozen compartment to the refrigerator compartment;
   a freezer temperature sensing means for sensing a temperature sensed in the freezer compartment;
   a refrigerator compartment temperature sensing means for sensing temperature in the refrigerator compartment;
   a control means responsive to the freezer compartment temperature sensing means sensing a temperature above a freezer compartment set point for causing (i) the cooling coil and compressor to start cooling air to a temperature below the freezer compartment set point and (ii) the fan means to start circulating air from the refrigerator and freezer compartments across the cooling coil, the control means continuing to cause the fan means to circulate air over the cooling coil and the compressor to continue supplying coolant fluid to the cooling coil to cool the circulating air until both the freezer compartment temperature sensing means senses a temperature at or below the freezer compartment set point and the refrigerator compartment sensing means senses a temperature at or below a refrigerator compartment set point, whereby the freezer compartment continues to be cooled below the freezer compartment set point until the refrigerator compartment reaches the refrigerator compartment set point.

2. The refrigerator-freezer combination as set forth in claim 1 further including a damper means disposed in the duct work system for selectively adjusting a ratio of the air from the cooling means circulated by the fan means to the refrigerator and freezer compartments.

3. The refrigerator-freezer combination as set forth in claim 2 wherein the damper means includes:
   a housing interconnected with the duct work system, the housing defining an opening in fluid communication with one of the freezer and refrigerator compartments;
   a damper member mounted for movement between an open position in which the opening is substantially unobstructed and a closed position in which the opening is obstructed; and,
   an electro-magnetic means for selectively moving said damper member between the open and closed positions.

4. The refrigerator-freezer combination as set forth in claim 3 wherein the electro-magnetic means includes a first coil for moving the damper toward the open position and a second coil for moving the damper toward the closed position.

5. The refrigerator freezer combination as set forth in claim 4 further including:
a charge pulse supply means for selectively applying a first charge pulse to the first coil and a second charge pulse to the second coil, the relative sizes of the first and second pulses controlling relative movement of the damper.

6. The refrigerator-freezer combination as set forth in claim 1 further including a sampling means for cyclically sampling the refrigerator and freezer compartment temperature sensing means, the sampling means being operatively connected with the control means to convey the sensed temperatures thereto.

7. The refrigerator-freezer combination as set forth in claim 6 further including:
a defrosting heater disposed adjacent the cooling means for selectively defrosting the cooling means;
a rate of fall determining means operatively connected with the sampling means for measuring a rate of fall of temperature sensed by at least one of the refrigerator and freezer compartment temperature sensing means; and,
a defrost heater actuation means for actuating the defrost heater in response to the measured temperature fall rate being slower than a preselected rate.

8. The refrigerator-freezer combination as set forth in claim 7 further including a disabling means for disabling the cooling means and the fan means while the defrost heater is actuated.

9. The refrigerator-freezer combination as set forth in claim 7 further including a cooling means temperature sensing means for sensing the temperature of the cooling means and a defrost heater deactuating means for selectively deactuating the defrost heater in accordance with the sensed cooling temperature.

10. The refrigerator-freezer combination as set forth in claim 1 further including:
a door for closing at least one of the refrigerator and freezer compartments;
a mullion on the one compartment surrounding the door, which mullion is subject to environmental moisture condensation thereon;
a mullion heating means disposed adjacent the mullion;
a mullion temperature sensing means mounted on the mullion for sensing the temperature thereadjacent; and,
a mullion heater actuating means for selectively actuating the mullion heater to hold the mullion at a temperature above a preselected minimum temperature.

11. The refrigerator-freezer combination as set forth in claim 1 further including;
a door for closing at least one of the refrigerator and freezer compartments;
a ferromagnetic material mounted in one of the door and the compartment;
a magnetic gasket mounted to the other of the door and the compartment for sealing the door and the compartment by magnetic attraction therebetween;
a Hall-effect switch mounted on the said other of the door and compartment, the Hall-effect switch being switched between first and second states by proximity of the magnetic gasket such that the Hall-effect switch is in a first state when the door is closed and a second state when the door is opened.

12. The refrigerator-freezer combination as set forth in claim 1 further including:
a cooling means temperature sensing means for sensing temperature of the cooling means;
a comparing means for comparing the sensed temperature of the cooling means during operation of the cooling means with the sensed temperature of the cooling means prior to operation to determine a temperature differential therebetween; and.
a malfunction indicating means operatively connected with the comparing means for indicating a system malfunction in response to the temperature differential failing to exceed a selected minimum temperature differential.

13. The apparatus as set forth in claim 1 further including a delay means operatively connected between the control means and the fan means for delaying operation of the fan means such that operation of the fan means is delayed for a short duration after the cooling means is enabled.

14. A refrigerator-freezer combination comprising:
a refrigerator compartment for holding food stuffs that are to be maintained at a chilled, above freezing temperature;
a freezer compartment for retaining food stuffs that are to be held at a below freezing temperature;
a cooling means for cooling air below freezing;
a fan means for circulating air over the cooling means;
a duct work system operatively connected with the refrigerator compartment, the freezer compartment, the fan, and the cooling means such that the fan draws air from both the refrigerator and freezer compartments and circulates it over the cooling means and into at least the freezer compartment;
a housing interconnected with the duct work system, the housing defining an opening in fluid communication with the refrigerator compartment;
a damper member mounted for movement between an open position in which the opening is at least partially unobstructed and a closed position in which the opening is obstructed;
an electro-magnetic means for selectively moving said damper member between the open and closed positions;
an actuating means for actuating the electro-magnetic means, the actuating means including:
a charger storage capacitor;
a charging means for charging the capacitor in a first duration;
a switching means for switching the electro-magnetic means across the capacitor and for pulsing current therethrough to move the damper member, pulsing current through the electro-magnetic means discharges the capacitor in a second duration which second duration is shorter than the first duration; and,
an inhibiting means for inhibiting connection of the capacitor across the electro-magnetic means until the capacitor has been recharged by a recharging means, whereby the damper door is inhibited from being moved for a difference between the first and second durations after each actuation;
a freezer temperature sensing means for sensing a temperature sensed in the freezer compartment;

a refrigeration compartment temperature sensing means for sensing temperature in the refrigerator compartment;

a control means responsive to the freezer compartment temperature sensing means sensing a temperature above a freezer compartment set point for causing (i) the cooling means to start cooling air to a temperature below the freezer compartment set point and (ii) the fan means to start circulating air from the refrigerator and freezer compartments across the cooling means, the control means continuing to cause the fan means to circulate air over the cooling means to cool the circulating air until both the freezer compartment temperature sensing means senses a temperature at or below the freezer compartment set point and the refrigerator compartment sensing means senses a temperature at or below a refrigerator compartment set point.

15. A refrigerator-freezer combination comprising:

a refrigerator compartment for holding food stuffs that are to be maintained at a chilled, above freezing temperature;

a freezer compartment for retaining food stuffs that are to be held at a below freezing temperature;

a cooling means for cooling air below freezing;

a fan means for circulating air over the cooling means;

a duct work system operatively connected with the refrigerator compartment, the freezer compartment, the fan, and the cooling means such that the fan draws air from both the refrigerator and freezer compartments and circulates it over the cooling means to at least the freezer compartment;

a freezer temperature sensing means for sensing a temperature sensed in the freezer compartment;

a refrigerator compartment sensing means for sensing temperature in the refrigerator compartment;

a control means responsive to the freezer compartment temperature sensing means sensing a temperature above a freezer compartment set point for causing (i) the cooling means to start cooling air to a temperature below the freezer compartment set point and (ii) the fan means to start circulating air from the refrigerator and freezer compartments across the cooling means, the control means continuing to cause the cooling means to cool air and the fan means to circulate air until both the freezer compartment temperature sensing means senses a temperature at or below the freezer compartment set point and the refrigerator compartment sensing means senses a temperature at or below a refrigerator compartment set point;

a damper means connected between the duct work system and the refrigerator compartment for selectively passing cooled air into the refrigerator compartment;

a damper control means responsive to the refrigerator compartment temperature sensing means sensing a temperature above the refrigerator compartment set point for actuating the fan means to circulate air through the duct work system into the freezer compartment and for moving the damper to direct air from the duct work system into the refrigerator compartment, whereby cold air is moved from the freezer compartment to the refrigerator compartment until the freezer compartment temperature sensing means senses a temperature above the freezer compartment set point which causes the control means to start the cooling means cooling and wherein the fan means continues to circulate air from the freezer and refrigerator compartments over the cooling means until both the freezer and refrigerator compartments are below their respective set points.

16. The refrigerator-freezer combination as set forth in claim 2 further including a logic means having:

a plurality of input ports for receiving input signals representative of operating parameters;

a processing means for processing the input signals and determining a damper position therefrom in accordance with the operating parameters; and, an output port for supplying a control signal to the electromotive means to move the damper to said position.

17. The refrigerator-freezer combination as set forth in claim 2 wherein the damper means includes:

a damper door disposed adjacent a wall which separates the refrigerator and freezer compartments and slideable between a closed position in which air flow is blocked and an open position in which air flow is permitted, the damper means being oriented such that the damper door slides in a substantially horizontal direction, whereby gravity does not bias said damper door toward either the open or closed position; and electromagnetic means operatively connected with the damper door for selectively sliding said damper door between the open and closed positions, the electromagnetic means including a first coil responsive to a first electrical signal for sliding the damper door to the closed position and a second coil responsive to a second electrical signal for sliding the damper door to the open position;

whereby the damper door is selectively opened and closed by transitory application of the first or second electrical signals and remains in the position without continuous expenditure of electrical energy.

18. A control system for a refrigeration device having at least first and second cooled compartments which are interconnected by an air door for selectively passing cooled air therebetween, the control system comprising:

a first temperature sensing means disposed in the first compartment for sensing a temperature therein;

an air door control means operatively connected with the first temperature sensing means for operating the air door to allow refrigerated air to pass from the second compartment to the first compartment in response to the sensed temperature in the first compartment rising above a first set point;

a second temperature sensing means disposed in the second compartment for sensing a temperature therein;

a control means for selectively actuating a fan and a cooling means for cooling the second compartment in response to the sensed temperature in the second compartment exceeding a second set point and for deactivating the fan and cooling means in response to the sensed second compartment temperature dropping below the second set point; and, an override means operatively connected with the first temperature sensing means for preventing the control means from deactivating the fan and cooling means from cooling the second compartment until the first sensor senses that the sensed temperature in the first compartment has fallen below the first set point, such that the second compartment is cooled below the second set point, whereby efficiency is improved by running the cooling means for fewer longer durations and damage from temperatures in the second compartment above the second set point is minimized.

19. A method of controlling temperatures in at least two refrigeration compartments which are cooled by a common cooling means over which air is passed, the method comprising:

sensing temperature in a first of the compartments;

selectively moving cooled air from a second of the compartments into the first compartment in response to the sensed first temperature compartment rising above a first set point;

sensing a temperature of the second compartment;

actuating the cooling means and circulating air thereacross and into the second compartment in response to the temperature sensed in the second compartment exceeding a second set point;

continuing moving air across the cooling means into the second compartment until both (i) the temperature sensed in the first compartment drops below the first set point and (ii) the temperature sensed in the second compartment drops below the second set point, whereby one of the compartments is cooled below its set point; and, after the temperatures of both compartments have dropped below their respective set points, deactuating the cooling means and terminating circulation of the cooled air.

20. The method as set forth in claim 19 further including the step of blocking the moving of cooled air into the first compartment in response to the first compartment dropping below the first set point such that cooled air is moved only to the second compartment.

* * * * *

UNITED STATES PATENT AND TRADEMARK OFFICE
CERTIFICATE OF CORRECTION

PATENT NO. : 4,843,833
DATED : July 4, 1989
INVENTOR(S) : John Polkinghorne

It is certified that error appears in the above-identified patent and that said Letters Patent is hereby corrected as shown below:

At column 14, line 9, delete "and", insert ---at---.

In Claim 1, column 16, line 14, delete "connecting", insert ---connected---.

Signed and Sealed this

Twenty-fourth Day of July, 1990

*Attest:*

HARRY F. MANBECK, JR.

*Attesting Officer*  *Commissioner of Patents and Trademarks*